US012632744B1

(12) United States Patent
Tang et al.

(10) Patent No.: US 12,632,744 B1
(45) Date of Patent: May 19, 2026

(54) MULTIPLE QUESTIONS, MULTIPLE ANSWERS SERVICE

(71) Applicant: Amazon Technologies, Inc., Seattle, WA (US)

(72) Inventors: Peng Tang, La Verne, CA (US); Srikar Appalaraju, Martinez, CA (US); R. Manmatha, San Francisco, CA (US); Yusheng Xie, Mountain View, CA (US); Vijay Mahadevan, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 861 days.

(21) Appl. No.: 17/935,450

(22) Filed: Sep. 26, 2022

(51) Int. Cl.
|   |   |
|---|---|
| *G06N 5/022* | (2023.01) |
| *G06F 16/3329* | (2025.01) |
| *G06F 16/334* | (2025.01) |
| *G06F 40/30* | (2020.01) |
| *G06F 40/56* | (2020.01) |
| *G06V 30/10* | (2022.01) |
| *G10L 13/00* | (2006.01) |
| *G10L 15/26* | (2006.01) |

(52) U.S. Cl.
CPC ............. *G06N 5/022* (2013.01); *G06V 30/10* (2022.01); *G10L 13/00* (2013.01); *G10L 15/26* (2013.01); *G06F 16/3329* (2019.01); *G06F 16/3344* (2019.01); *G06F 40/30* (2020.01); *G06F 40/56* (2020.01)

(58) Field of Classification Search
CPC ........ G06N 5/022; G06V 30/10; G10L 13/00; G10L 15/26; G06F 40/56; G06F 40/30; G06F 16/3329; G06F 16/3344; G06L 15/1822
See application file for complete search history.

(56) References Cited

U.S. PATENT DOCUMENTS

| | | | | |
|---|---|---|---|---|
| 2022/0067486 A1* | 3/2022 | Klein | .................... | G06N 3/0455 |
| 2022/0327287 A1* | 10/2022 | Agrawal | ................. | G06F 40/56 |
| 2022/0358295 A1* | 11/2022 | Nair | ....................... | G06F 16/353 |
| 2023/0135179 A1* | 5/2023 | Mielke | ................... | G06N 5/022 |
| | | | | 704/232 |

(Continued)

FOREIGN PATENT DOCUMENTS

CN          114840648 A  *  8/2022  ............. G06N 3/044

OTHER PUBLICATIONS

Antol et al., "VQA: Visual Question Answering", May 3, 2015, pp. 1-16.

(Continued)

*Primary Examiner* — Quoc A Tran
(74) *Attorney, Agent, or Firm* — Nicholson De Vos Webster & Elliott LLP

(57) ABSTRACT

Techniques for answering multiple questions with multiple answers are described. An example includes taking in a plurality of questions and a single context including at least one of text, encoded audio data, or encoded visual data, generating embeddings for at least one of the plurality of questions, the single context, and question identifying information, encoding the generated embeddings, and decoding the encoded embeddings using trainable prompts to predict an answer for each of the plurality of questions.

20 Claims, 10 Drawing Sheets

(56) References Cited

U.S. PATENT DOCUMENTS

2023/0274094 A1* 8/2023 Tunstall-Pedoe ....... G06F 40/30
704/9

OTHER PUBLICATIONS

Appalaraju et al., "DocFormer: End-to-End Transformer for Document Understanding", Sep. 20, 2021, 22 pages.
AWS, "Amazon Textract", available online at <https://aws.amazon.com/textract/>, 2025, 4 pages.
Ba et al., "Layer Normalization", Jul. 21, 2016, 14 pages.
Biten et al., "ICDAR 2019 Competition on Scene Text Visual Question Answering", Jun. 30, 2019, 8 pages.
Davis et al., "Deep Visual Template-Free Form Parsing", Sep. 18, 2019, 9 pages.
Devlin et al., "BERT: Pre-training of Deep Bidirectional Transformers for Language Understanding", May 24, 2019, 16 pages.
Google Cloud, "Document AI", available online at <https://cloud.google.com/document-ai>, 2025, 8 pages.
Huang et al., "ICDAR2019 Competition on Scanned Receipt OCR and Information Extraction", Mar. 18, 2021, pp. 1-6.
Huang et al., "LayoutLMv3: Pre-training for Document AI with Unified Text and Image Masking", Jul. 19, 2022, 10 pages.
Kim et al., "Donut: Document Understanding Transformer without OCR", Nov. 30, 2021, 12 pages.
Majumder et al., "Representation Learning for Information Extraction from Form-like Documents", Proceedings of the 58th Annual Meeting of the Association for Computational Linguistics, Jul. 5-10, 2020, pp. 6495-6504.
Mathew et al., "Document Visual Question Answering Challenge 2020", Jul. 18, 2021, 4 pages.
Mathew et al., "DocVQA: A Dataset for VQA on Document Images", 2020, 10 pages.
Microsoft, "Azure Document Intelligence in Foundry Tools", available online at <https://azure.microsoft.com/en-us/products/ai-foundry/tools/document-intelligence>, 2025, 7 pages.
Paszke et al., "PyTorch: An Imperative Style, High-Performance Deep Learning Library", 33rd Conference on Neural Information Processing Systems (NeurIPS 2019), 12 pages.
Powalski et al., "Going Full-TILT Boogie on Document Understanding with Text-Image-Layout Transformer", Jul. 12, 2021, 18 pages.
Raffel et al., "Exploring the Limits of Transfer Learning with a Unified Text-to-Text Transformer", Journal of Machine Learning Research 21, 2020, pp. 1-67.
Schreiber et al., "DeepDeSRT: Deep Learning for Detection and Structure Recognition of Tables in Document Images", 2017, 6 pages.
Vaswani et al., "Attention Is All You Need", 31st Conference on Neural Information Processing Systems (NIPS 2017), pp. 1-11.
Wolf et al., "Transformers: State-of-the-Art Natural Language Processing", Proceedings of the 2020 EMNLP (Systems Demonstrations), Nov. 16-20, 2020., pp. 38-45.
Wu et al., "Google's Neural Machine Translation System: Bridging the Gap between Human and Machine Translation", Oct. 8, 2016, pp. 1-23.
Xu et al., "LayoutLM: Pre-training of Text and Layout for Document Image Understanding", ACM, 2020, 9 pages.
Xu et al., "LayoutLMv2: Multi-modal Pre-training for Visually-rich Document Understanding", Proceedings of the 59th Annual Meeting of the Association for Computational Linguistics and the 11th International Joint Conference on Natural Language Processing, Aug. 1-6, 2021, pp. 2579-2591.

* cited by examiner

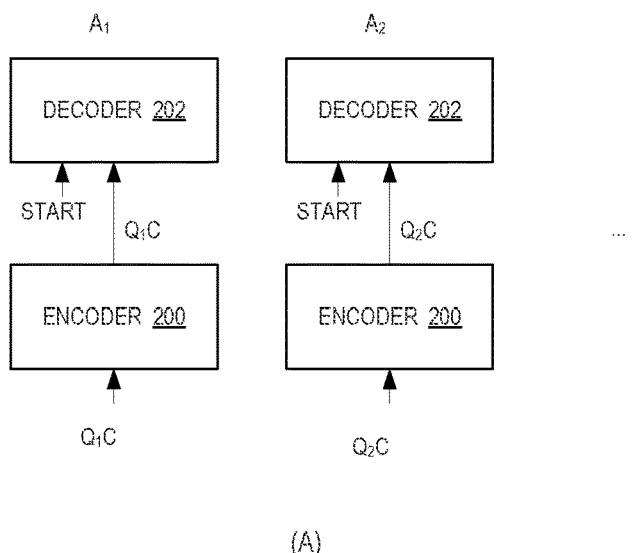
(A)
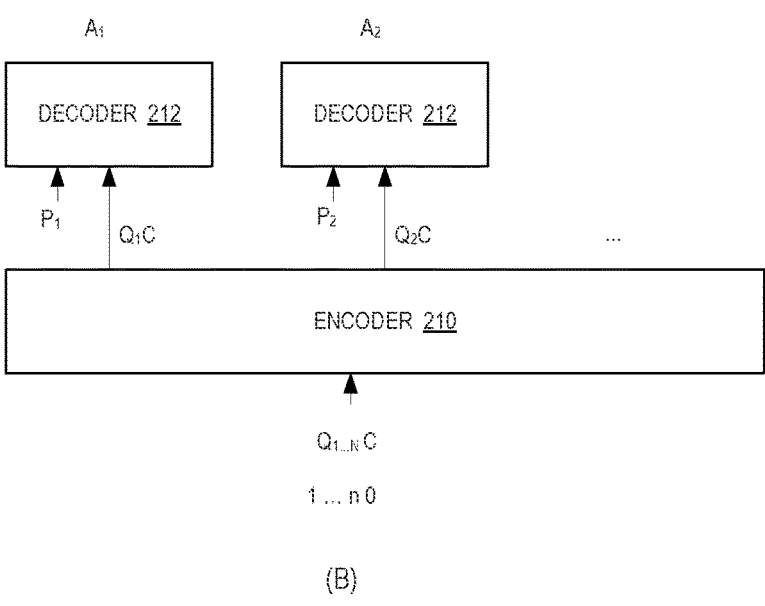
(B)
*FIG. 2*

USER GUI 300

| | |
|---|---|
| QUESTION 1 | TEXT |
| QUESTION 2 | TEXT |
| DATA SOURCE | SELECTION OR TEXT |
| DATA SOURCE TYPE | SELECTION OR TEXT |

USER GUI 320

QUESTION 1 TEXT

ANSWER TEXT

QUESTION 2 TEXT

ANSWER TEXT

FIG. 3

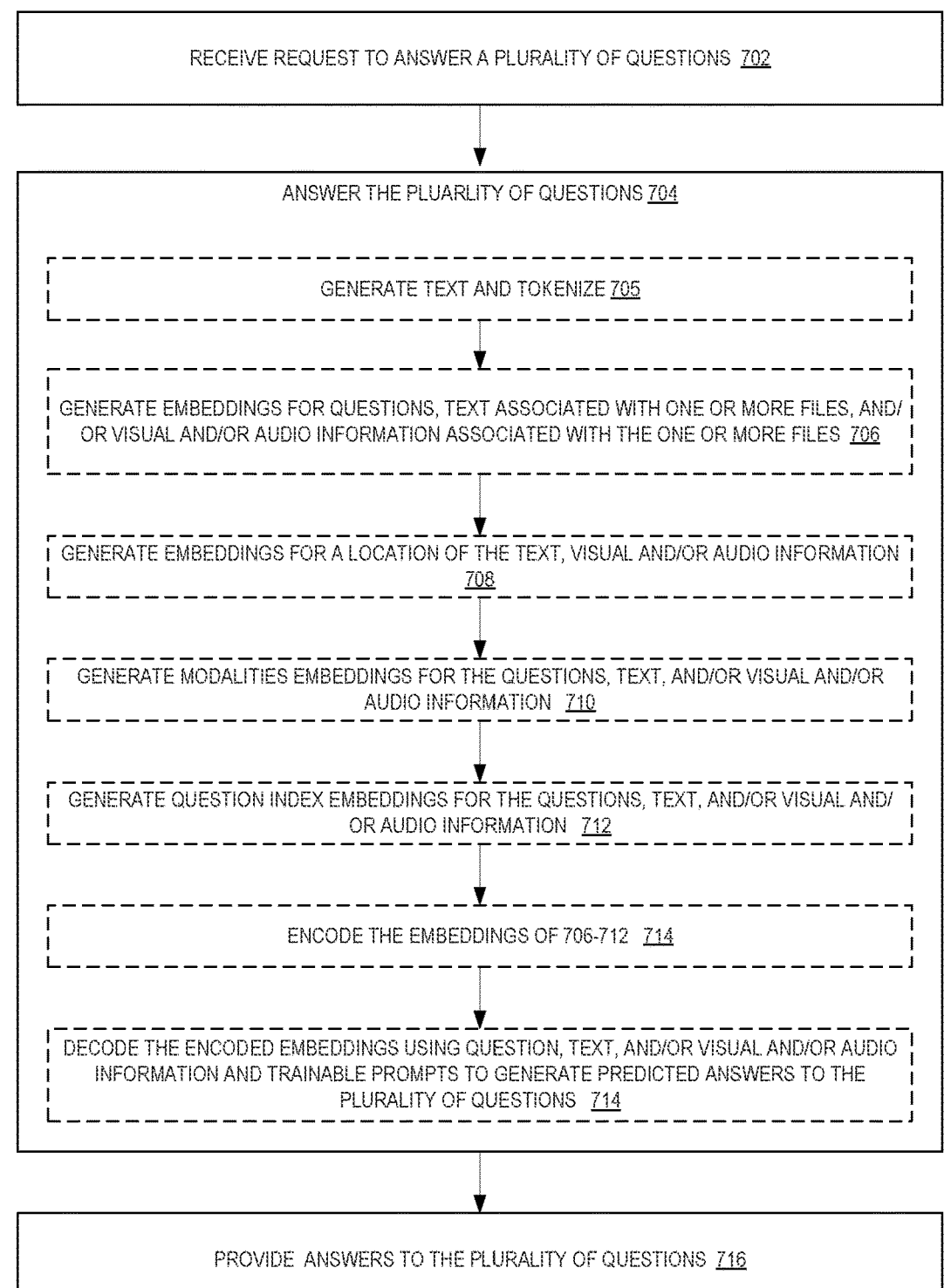

RECEIVE REQUEST TO ANSWER A PLURALITY OF QUESTIONS 702

ANSWER THE PLUARLITY OF QUESTIONS 704

GENERATE TEXT AND TOKENIZE 705

GENERATE EMBEDDINGS FOR QUESTIONS, TEXT ASSOCIATED WITH ONE OR MORE FILES, AND/ OR VISUAL AND/OR AUDIO INFORMATION ASSOCIATED WITH THE ONE OR MORE FILES 706

GENERATE EMBEDDINGS FOR A LOCATION OF THE TEXT, VISUAL AND/OR AUDIO INFORMATION 708

GENERATE MODALITIES EMBEDDINGS FOR THE QUESTIONS, TEXT, AND/OR VISUAL AND/OR AUDIO INFORMATION 710

GENERATE QUESTION INDEX EMBEDDINGS FOR THE QUESTIONS, TEXT, AND/OR VISUAL AND/ OR AUDIO INFORMATION 712

ENCODE THE EMBEDDINGS OF 706-712 714

DECODE THE ENCODED EMBEDDINGS USING QUESTION, TEXT, AND/OR VISUAL AND/OR AUDIO INFORMATION AND TRAINABLE PROMPTS TO GENERATE PREDICTED ANSWERS TO THE PLURALITY OF QUESTIONS 714

PROVIDE ANSWERS TO THE PLURALITY OF QUESTIONS 716

*FIG. 7*

MULTIPLE QUESTIONS, MULTIPLE ANSWERS SERVICE

BACKGROUND

Document Visual Question Answering (VQA), which extracts information from document images by answering questions of given document images, has attracted attention in recent years. Unlike generic VQA which answers questions mainly using visual information, document VQA considers multiple modalities (i.e., visual, language, and layout modalities) to answer questions.

BRIEF DESCRIPTION OF DRAWINGS

Various examples in accordance with the present disclosure will be described with reference to the drawings, in which:

FIGS. 2(A)-(B) illustrate examples of single question, single answer (SQSA) and MQMA architectures.

FIG. 3 illustrates examples of graphical user interfaces for a user to input questions and receive answers.

FIG. 7 is a flow diagram illustrating operations of a method for using a model to answering multiple questions with multiple answers according to some examples.

DETAILED DESCRIPTION

The present disclosure relates to methods, apparatus, systems, and non-transitory computer-readable storage media for at least performing multiple questions, multiple answers (MQMA) on visual documents.

Previous approaches fed a single question and context (i.e., text and bounding boxes from optical character recognition (OCR) and the document image itself) into their models and get a single answer at a time. To answer multiple questions of the same document image, previous approaches feed a question and context into the model multiple times, which results in high inference latency because the same context needs to be processed multiple times for multiple questions.

Detailed herein as a multiple question, multiple answer (MQMA) approach for document VQA. Unlike previous approaches, the MQMA approach described takes multiple questions and context as inputs and predicts multiple answers at the same time, so the same context is only processed once for multiple questions. In addition, a novel unsupervised pre-training task for MQMA document VQA specifically may be utilized. This pre-training task aligns the pre-training task and the down-streaming task for higher accuracy. In particular, this approach reduces encoder latency by more than 50% and also improves accuracy.

Figure 1:
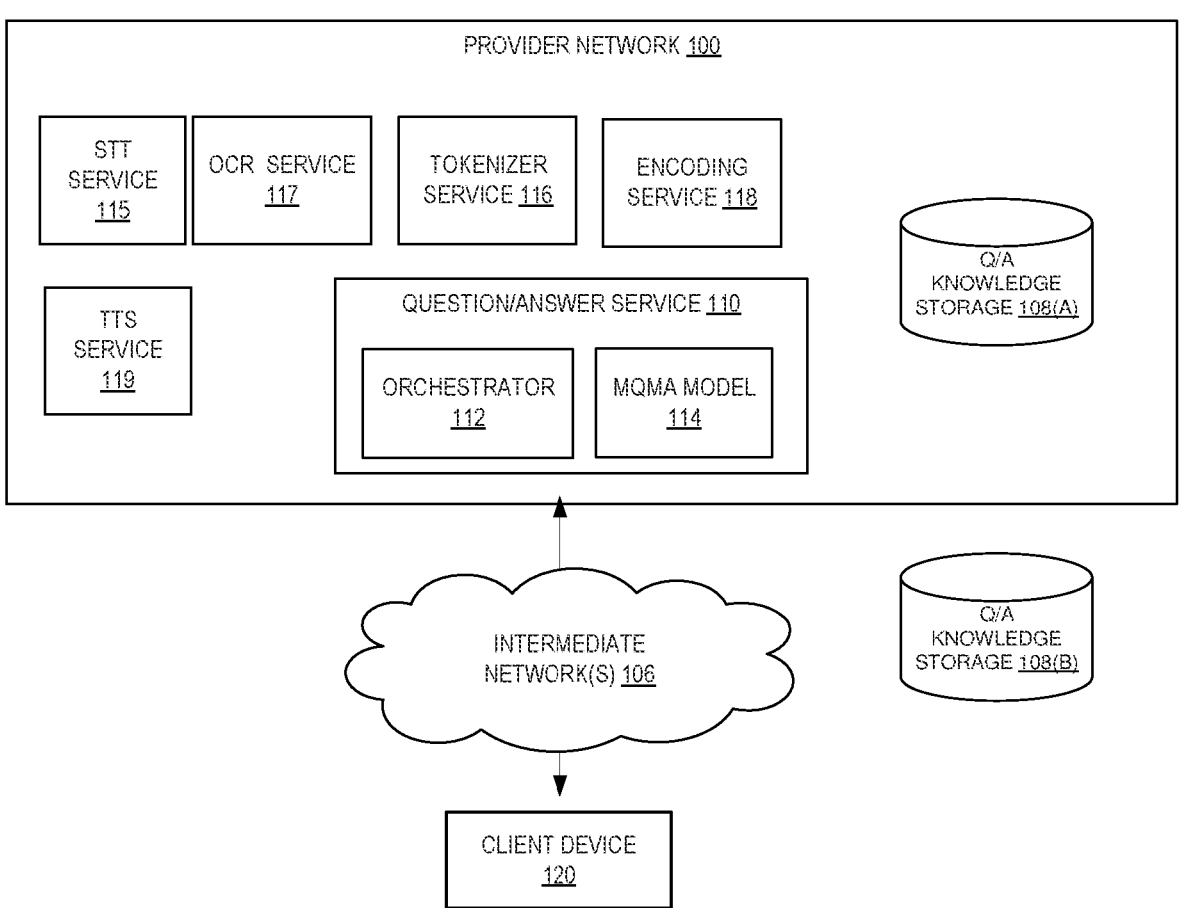
FIG. 1 illustrates examples including a question/answer service.

FIG. 1 illustrates examples including a question/answer service. As shown, a question/answer service 110 of a provider network 100 allows a user using a client device 120 to ask a question and get an answer. In particular, a query may be made for a plurality of questions against one or more datasets stored in Q/A knowledge storage 108(A) or 108(B) using one or more MQMA models 114.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

The question/answer service 110 includes at least one MQMA model 114. This model takes in multiple questions and context and then uses the same context to answer the multiple questions. Previous approaches answered a single question at a time. FIGS. 2(A)-(B) illustrate examples of single question, single answer (SQSA) and MQMA architectures. As shown in FIG. 2(A), the SQSA architecture utilizes a plurality of encoders (or encoder instances) each of when take in a question and context (such as text, bounding boxes, and a documents itself). The output of the encoders is then into decoders along with a start token as used in conventional Transformer decoding.

As shown in FIG. 2(B), MQMA uses a single encoder which is fed a plurality of questions, context, and indexing information. In some examples, multiple questions and context are fed into a transformer encoder as a single input sequence. Therefore, the same context is only processed once for multiple questions. In addition, to distinguish different questions and context in the inputs, a question index embedding layer is applied which uses different embeddings for different questions and context, where the embedding of index i is used for the i-th question and the embedding of index 0 is used for context. Moreover, to decode the answers to different questions, a prompt-based decoding approach is used. Specifically, auto-regressive prediction is performed beginning with trainable prompts (shown as P) instead of the [START] token in the conventional transformer decoder. These prompts are trained during training. During inference, each answer has its own prompt to associate the corresponding question and context and different answers are decoded separately. Comparing with SQSA, MQMA can reduce the encoder latency because the context is encoded once instead of multiple times for multiple questions, and MQMA has the same decoder latency as SQSA because different answers are decoded separately.

In some examples, a tokenizer service 116 generates tokens to be used as an input into a MQMA model 114. In some examples, an encoding service 118 generates encoded video or audio data to be used as an input into a MQMA model 114. In some examples, an optical character recognition (OCR) service 117 generates text from a visual file to be used an input into a MQMA model 114. In some examples, a speech-to-text (STT) service 115 generates text from audio file to be used an input into a MQMA model 114. In some examples, the question/answer service 110 uses an orchestrator to coordinate the MQMA model 114 and other services. Note that the services detailed above may be a part of the question/answer service 110 in some examples. In some examples, a text-to-speech (TTS) service 119 generates audio from text output from a MQMA model 114.

FIG. 3 illustrates examples of graphical user interfaces for a user to input questions and receive answers. User graphical user interface (GUI) 300 allows a user to interact with the question/answer service 110. In particular, a user may input a plurality of questions into defined text boxes. In this example, there is a separate box per question, but some examples support multiple questions per box. In some examples, the user also specifies by text or selection the Q/A data source(s) and/or data source type (e.g., text, audio, visual, audio/visual).

The question/answer service 110 provides a response user GUI 320 that provides answers to each question. In some examples, the text of the question is repeated. In some examples, where the answer to the question is shown in the document searched.

Figure 4:
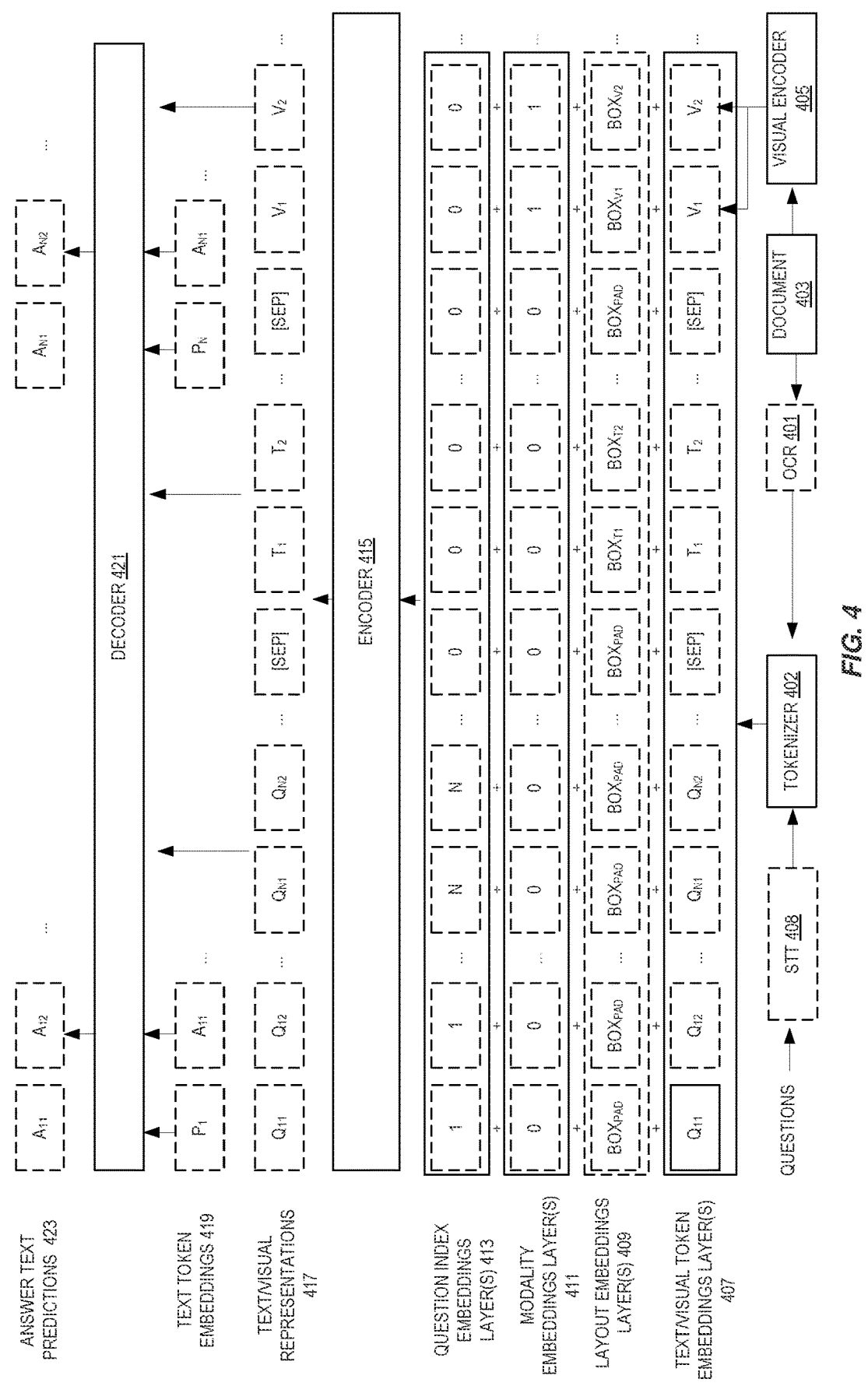
FIG. 4 illustrates examples of a MQMA architecture.

FIG. 4 illustrates examples of a MQMA architecture. This architecture takes questions and context (i.e., text and bounding boxes from optical character recognition (OCR) 401 and the document image itself 403) as inputs. The inputs are processed by embedding layers 407-413 to get input embeddings. These embeddings are fed into an encoder 415 (e.g., an encoder with self-attention layers, feed forward layers, and layer normalization layers) to get encoder representations. In some examples, the encoder 415 is Transformer-based. One or more decoders 421, consisting of a series of self-attention layers, cross attention layers, feed-forward layers, and layer normalization layers, decode answers as predictions in an auto regressive manner.

Unlike other architecture that only take in a single modality language as encoder inputs, examples herein take inputs from multiple modalities, i.e., visual, language, and/or layout. In addition, to answer different questions, examples of the model are trained on different prompts for the decoder 421. The decoder 421 performs auto-regressive prediction beginning with these trained prompts instead of the [START] token in other approaches. Different questions/answers use different prompts and do decoding separately, which means the model outputs n sequences as n answers if it answers n questions at a time instead of a single sequence. In some examples, decoders for different questions/answers share the same weights.

Visual, language, and layout information may be important to answer questions for document VQA. A given input image 403 is first processed by OCR 401 to extract text $\{Ti\}$ and bounding boxes $\{BoxTi\}$ ($i \in \{1, 2, 3, \ldots\}$). The OCR text, OCR bounding boxes, question text (Qij, $i \in \{1, 2, \ldots, n\}, j \in \{1, 2, \ldots\}$, where n corresponds to the number of questions we want to answer at a time), and the document itself are fed into one or more embedding layers (e.g., a text/visual token embeddings layer 407 having one or more embedding layers for the OCR text (shown as T), question text (shown as Q), and visual encoded data (shown as V) to get different embeddings for different modalities. Notice that here that the text of n questions is input instead a single question. In some examples, only one of OCR and visual data may be available.

With respect to text embeddings, in some examples text embeddings are determined for question text and OCR results (e.g., shows as Q and T). For text, in some examples, a tokenizer (e.g., Wordpiece tokenizer) 402 tokenizes the text. A trainable text token embedding layer is then used to get the text token embeddings. In some examples, a [SEP] (separator) token is used between question text tokens and OCR text tokens and a [SEP] token is appended after OCR text tokens.

Apart from text token embeddings, layout embeddings of the text are calculated by using one or more trainable layout embedding layers 409 to map the coordinates (x1, y1, x2, y2, w, h) of text bounding boxes into layout embeddings, where all coordinates are normalized (e.g., to [0, 1000]). For question text tokens and [SEP], a pseudo box BOXPAD is used. In some examples, this represents the box (0, 0, 1000, 1000, 1000, 1000). One or more trainable modality embedding layers 411 distinguish text modality and visual modality, where the modality embeddings of 0 are used for the text modality in some examples (of course, this is merely illustrative). Additionally, a trainable question index embedding layer 413 distinguishes different questions and context, where the question index embeddings of i and 0 are used for the i-th question and context respectively. In some examples, the final text embeddings are the sum of text token embeddings, layout embeddings, modality embeddings, and question index embeddings. In other examples, a concatenation of these embeddings is used.

In some examples, visual embeddings for the document image itself are computed. In some examples, the document image is resized. The (resized) image is split the into non-overlapped patches in some examples. The patches or image itself, depending on the example, is mapped to embeddings by a linear layer with Layer Normalization to get embeddings with dimension $d_{emb}$ which depends on the model size. After that, a linear layer maps the embeddings to the final visual token embeddings $\{Vi\}i=1, Vi \in Rd_{emb}$.

To compute layout embeddings of the visual part, we first use some trainable layout embedding layers to map the location of the image patches into 192 layout embeddings, and we then use a linear layer to map these 192 layout embeddings into the final 128 layout embeddings. Similar to text embeddings, the final visual embeddings are the sum of visual token embeddings, layout embeddings, modality embeddings, and question index embeddings, where the modality embeddings of 1 and the question index embeddings of 0 are used for visual embeddings.

The final question, text, and/or visual embedding are provided to encoder 415 to generate text/visual representations 417. These text/visual representations 417 are provided to the decoder 421 to predict text answers 423 which uses a prompt-based approach for MQMA decoding. For example, n trainable prompts $\{Pi\}ni=1$ are used to decode n answers in parallel. Instead of beginning with the [START] token, the decoder 421 begins with the i-th prompt Pi to decode the answer Ai for the i-th question in an auto-regressive manner. These prompts are trained to associate corresponding questions and context.

In some examples, the encoder 415 and decoder 421 are pre-trained using unsupervised learning. Standing denoising uses masks over spans of original texts and tries to reconstruct the mask during training. MQMA denoising using question-answer pairs that follow a "which" and "what" style (e.g., Which text tokens are masked by [MASK$_1$] after "yyy" ? or What are the masked text tokens of [MASK$_1$] after "yyy" ?) where [MASK$_i$] corresponds to the i-th mask and "yyy" corresponds to the text before [MASK$_i$]. The answer of the quest ion is the original text of [MASK$_i$] (e.g., Which text tokens are masked by [MASK$_1$] after "Thank You" ? A: for inviting. Examples are shown below.

| | Standard Denoising | MQMA Denoising |
|---|---|---|
| Original Text | Thank you ~~for inviting~~ me to your party ~~last~~ week | Thank you ~~for inviting~~ me to your party ~~last~~ week |
| Input Text | Thank you [MASK$_1$] me to your party [MASK$_2$] week . . . | $Q_1 Q_2 \ldots Q_n$ [SEP] Thank you [MASK$_1$] me to your party [MASK$_2$] week . . . |
| Target | [MASK$_1$] for inviting [MASK$_2$] last . . . | $A_1 A_2 \ldots A_n$ |

Figure 5:
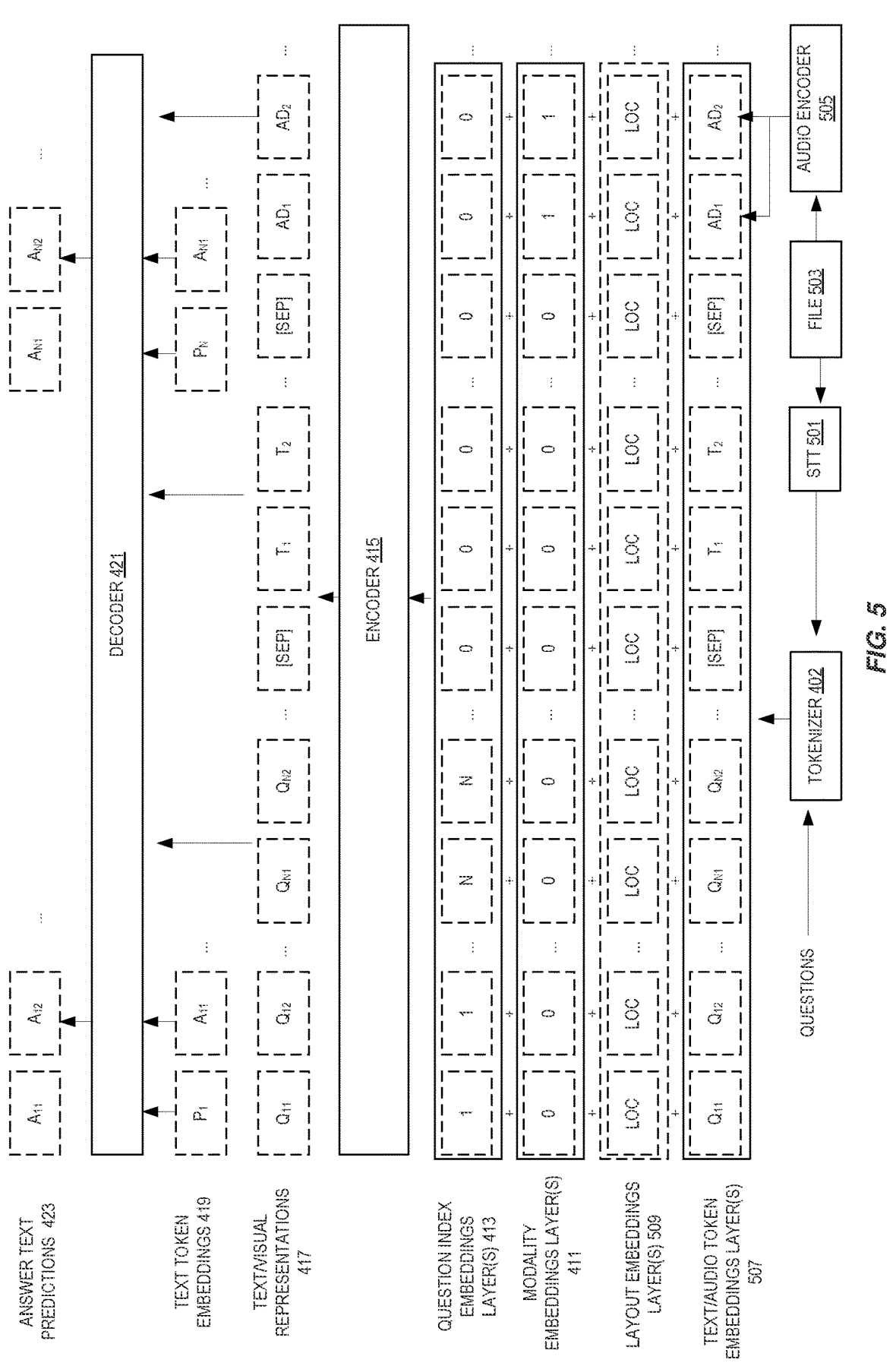
FIG. 5 illustrates examples of a MQMA architecture.

FIG. 5 illustrates examples of a MQMA architecture. These examples support audio instead of visual data. As shown, instead of a visual encoder an audio encoder 505 generates audio information from audio file 503 which is embedded by text/audio embeddings layers 507. STT 501 generates text from the audio file 503. In some examples, layout embeddings are not used. In other examples, layout embeddings generated by layout embeddings layers 509 are used to indicate where (a location) in the audio file (e.g., time) a particular section of text comes from.

Figure 6:
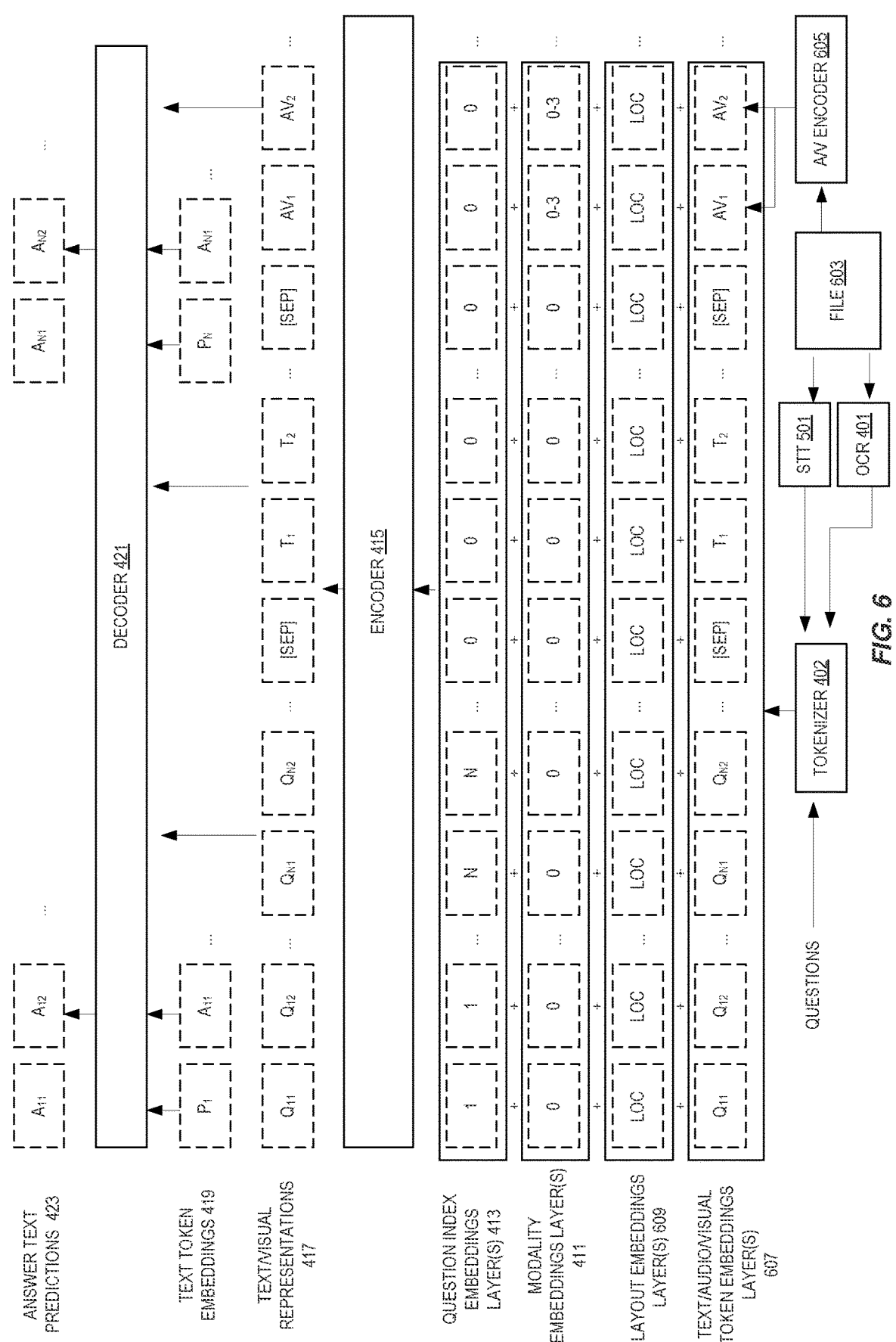
FIG. 6 illustrates examples of a MQMA architecture.

FIG. 6 illustrates examples of a MQMA architecture. These examples support audio/visual (A/V) data. As shown, instead of a visual encoder an audio/video encoder 605 generates audio information from A/V file 603 which is embedded by text/audio/visual embeddings layers 607. STT 501 generates text from the A/V file 503. In some examples, layout embeddings are not used. In other examples, layout embeddings generated by layout embeddings layers 609 are used to indicate where (a location) in the audio file (e.g., time) a particular section of text comes from, where in a visual file a particular section of text comes from, and/or where an OCRed image comes from (in this illustration, it is OCR information).

FIG. 7 is a flow diagram illustrating operations of a method for using a model to answering multiple questions with multiple answers according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by at least the question/answer service 110 of the other figures.

A MQMA request is received at '702. In some examples, the request includes one or more of a plurality of questions, an indication of what data to use as an answer repository, an indication of a type of data (e.g., text, video, audio, audio/ video) found in the answer repository, an indication of a particular location in the data (e.g., box, time, etc.), an indication of how to present a response (e.g., as a list of answers, highlighted answers, etc.), etc. The request may come in via an API call, GUI, etc.

The plurality of questions are answered using a MQMA model at 704. The MQMA model takes in the plurality of questions and a single context as inputs and predicts multiple answers at the same time. As such, the context is processed once. This may require a plurality of acts.

In some examples, text is generated from one or more visual, audio, or A/V files and tokenized, in some examples, at 705. For example, one or more of OCR and STT is/are performed.

Embeddings for all of the questions, text associated with the one or more visual, audio, or A/V files, and/or visual and/or audio information associated with the one or more visual, audio, or A/V files are generated 706. Examples of such generation have been detailed above.

In some examples, embeddings for a location of the text, visual and/or audio information are generated at 708.

Modalities embeddings for the questions, text, and/or visual and/or audio information are generated at 710. For example, is the information text or not.

Question index embeddings for the questions, text, and/or visual and/or audio information are generated at 712. For example, is the information a question or not.

The embeddings of 706-712 are encoded at 714. In some examples, the embeddings are summed first. The encoder may be a Transformer-based encoder.

The encoded embeddings are decoded using question, text, and/or visual and/or audio information and trainable prompts to generate predicted answers to the plurality of questions at 714.

The predicted answers to the plurality of questions are provided at 716. In some examples, text-to-speech is performed as a means of providing answers. In some examples, the text is output as a means of providing answers.

Figure 8:
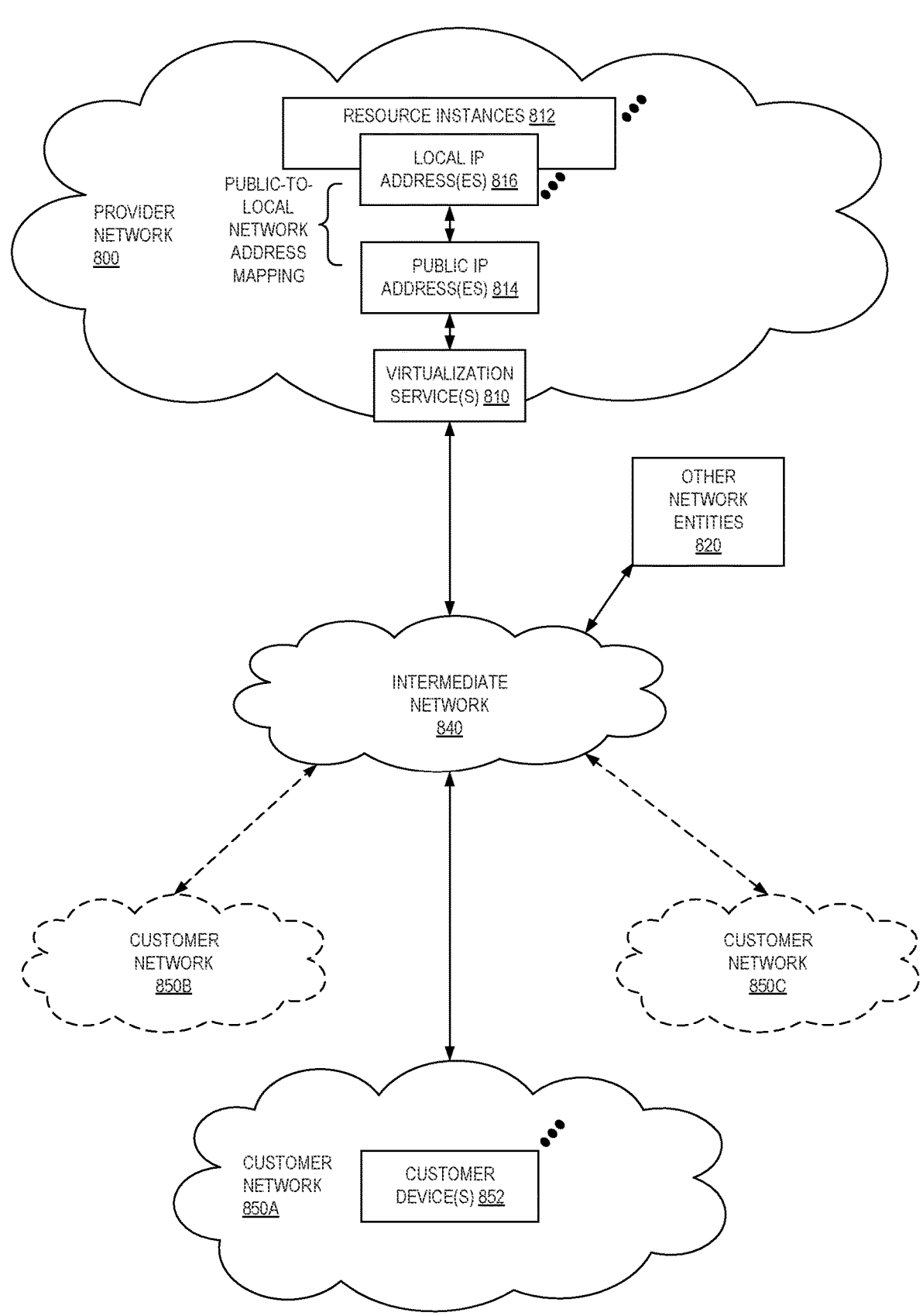
FIG. 8 illustrates an example provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
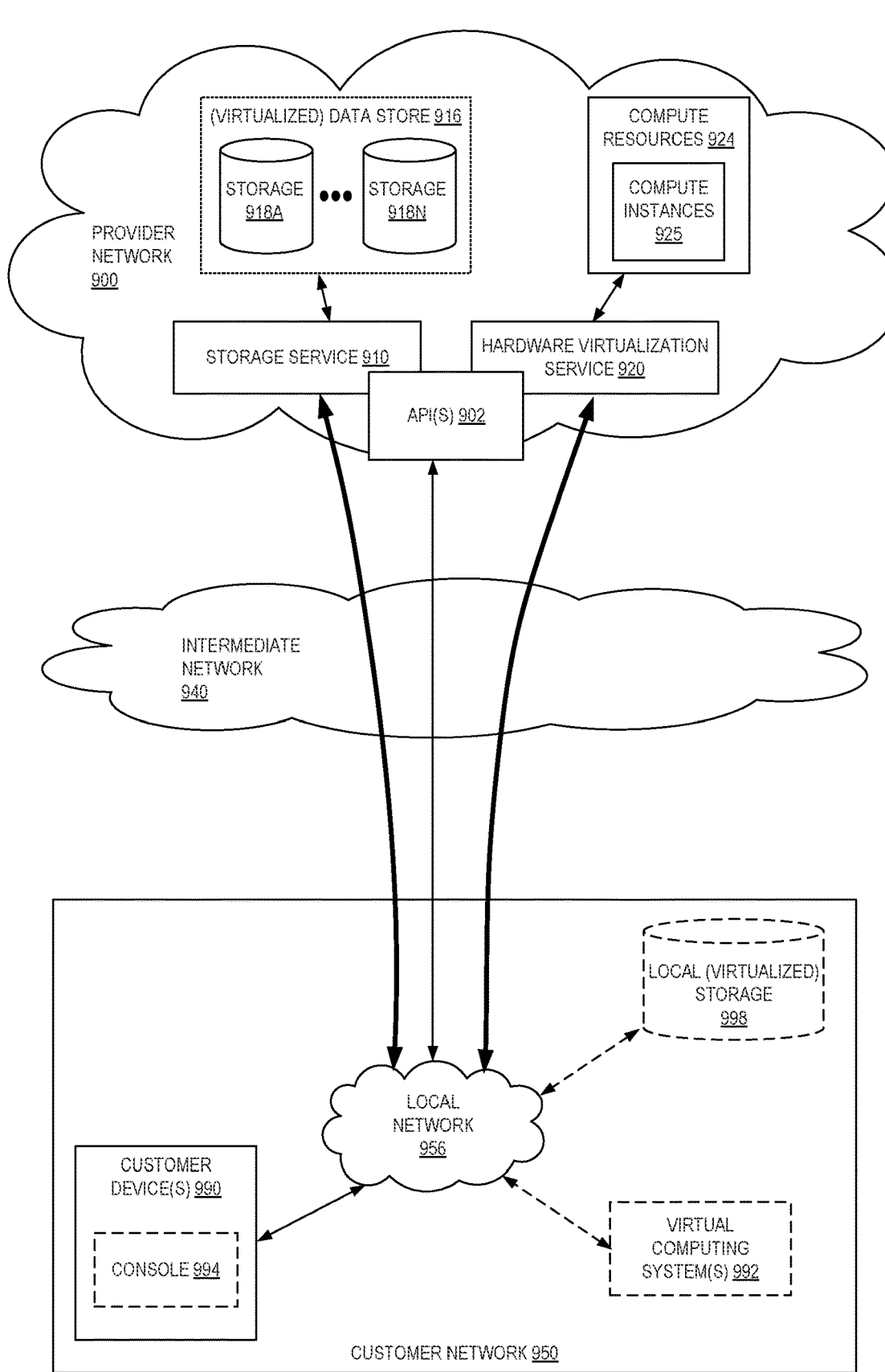
FIG. 9 is a block diagram of an example provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
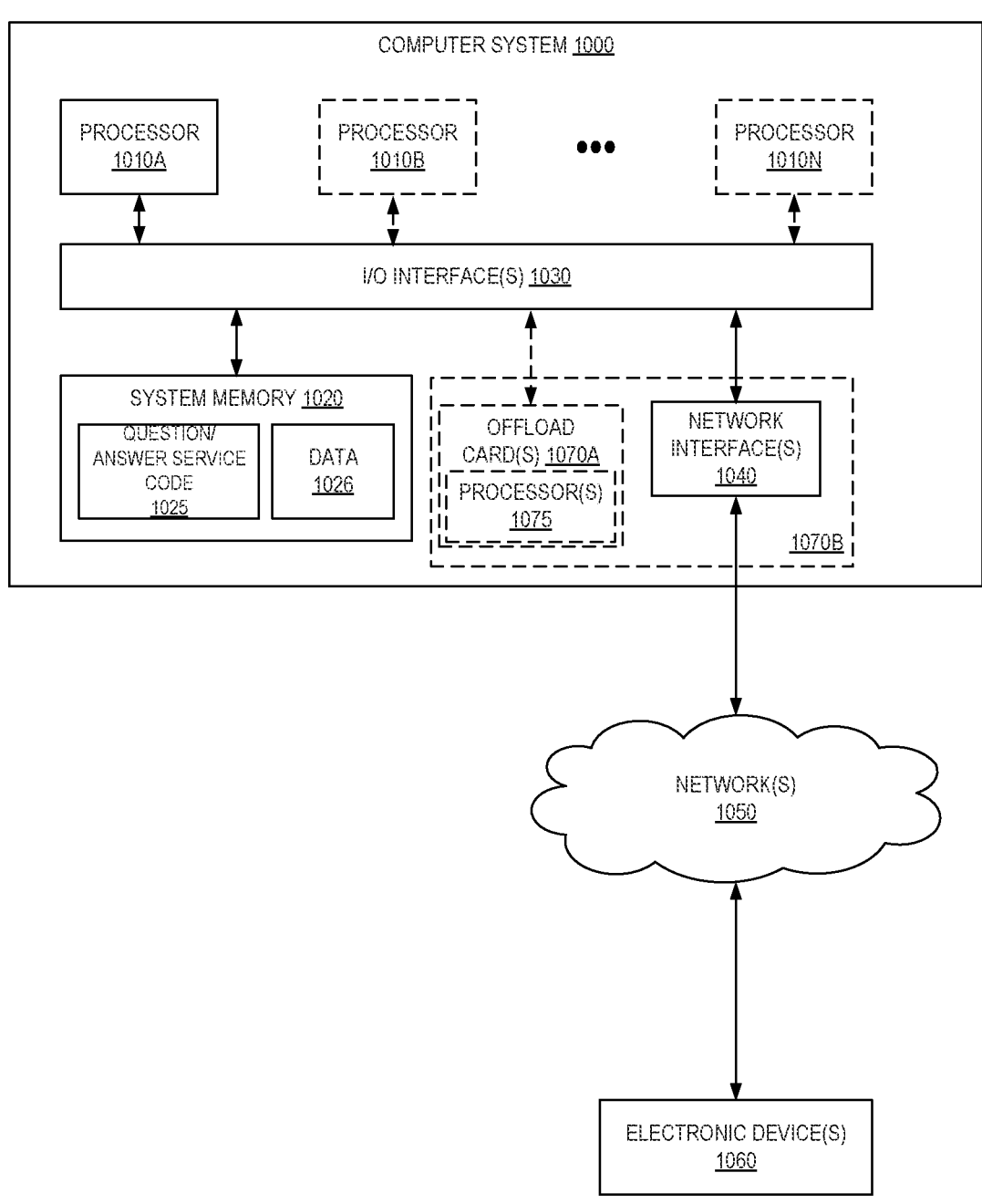
FIG. 10 is a block diagram illustrating an example computer system that can be used in some examples.

In some examples, a system that implements a portion or all of the techniques described herein can include a general-purpose computer system, such as the computer system 1000 illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as question/answer service code 1025 (e.g., executable to implement, in whole or in part, the question/answer service 110) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 110A-110N of the computer system 1000. However, in some examples the virtualization manager implemented by the offload card(s) 1070A or 1070B can accommodate requests from other entities (e.g., from compute instances themselves), and can not coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
receiving a request for answers to a plurality of questions using a multiple-questions, multiple-answers (MQMA) machine learning (ML) model, the request including the questions; and
answering the plurality of questions using the MQMA ML model by:
taking in the questions and a single context at the MQMA ML model, the single context including at least one of optical-character-recognized text or encoded visual data, generating, by the MQMA ML model implemented as code executed by one or more processors, embeddings for the questions, the single context, and question identifying information,
encoding, by a single Transformer-based encoder of the MQMA ML model implemented as the code executed by the one or more processors, the embeddings to generate encoded embeddings, wherein the single context is only processed once by the single Transformer-based encoder for the plurality of questions, and
decoding the encoded embeddings using auto-regressive prediction beginning with trainable prompts to predict an answer for each of the questions using a plurality of Transformer-based decoders.

2. The computer-implemented method of claim 1, wherein the request includes one or more of an indication of what data to use as an answer repository, an indication of a type of data found in the answer repository, an indication of a particular location in the data, or an indication of how to present a response.

3. The computer-implemented method of claim 1, wherein the answer for each of the questions is provided in a graphical user interface.

4. A computer-implemented method comprising:
receiving a request for answers to a plurality of questions using multiple-questions, multiple-answers (MQMA) machine learning (ML) model, the request including the questions;
receiving the questions and a single context at the MQMA ML model, the single context including at least one of text, audio data, or visual data;
generating, by the MQMA ML model implemented as code executed by one or more processors, embeddings for the questions, the single context, and question identifying information;
encoding, by a single encoder of the MQMA ML model implemented as the code executed by the one or more processors, the embeddings to generate encoded embeddings, wherein the single context is only processed once by the single encoder for the plurality of questions;
decoding the encoded embeddings using auto-regressive prediction beginning with trainable prompts to predict the answers to the questions; and
providing the answers to the questions.

5. The method of claim 4, wherein the questions and the single context are received at the single encoder of the MQMA ML model as a single input sequence.

6. The computer-implemented method of claim 4, wherein the questions are to be found from a visual file.

7. The computer-implemented method of claim 4, wherein the text is generated from optical character recognition.

8. The computer-implemented method of claim 4, wherein the encoding of the embeddings to generate encoded embeddings is performed by a Transformer-based encoder.

9. The computer-implemented method of claim 4, wherein at least one of the text and the questions is tokenized prior to intaking.

10. The computer-implemented method of claim 4, wherein the MQMA ML model has been pre-trained using question-answer pairs.

11. The computer-implemented method of claim 4, wherein the request includes one or more of an indication of what data to use as an answer repository, an indication of a type of data found in the answer repository, an indication of a particular location in the data, or an indication of how to present a response.

12. The computer-implemented method of claim 4, wherein an answer for each of the questions is provided in a graphical user interface.

13. The computer-implemented method of claim 4, wherein the questions are to be found from audio data by:

taking in the audio data; and generating embeddings for the audio data.

14. The computer-implemented method of claim 4, wherein answering the questions using the MQMA ML model further comprises:

taking in audio/video data; and generating embeddings for the audio/video data.

15. A system comprising:

a first one or more electronic devices to implement a storage service in a multi-tenant provider network to store data to be used as an answer source; and a second one or more electronic devices to implement a question/answer service in the multi-tenant provider network, the question/answer service including instructions that upon execution by one or more processors cause the question/answer service to:

receive a request for answers to a plurality of questions using a multiple-questions, multiple-answers (MQMA) machine learning (ML) model, the request including the questions;

receiving the questions and a single context at the MQMA ML model, the single context including at least one of text, audio data, or visual data;

generating, by the MQMA ML model implemented as code executed by one or more processors, embeddings for the questions, the single context, and question identifying information;

encoding, by a single encoder of the MQMA ML model implemented as the code executed by the one or more processors, the embeddings to generate encoded embeddings, wherein the single context is only processed once by the single encoder for the plurality of questions;

decoding the encoded embeddings using auto-regressive prediction beginning with trainable prompts to predict the answers to the questions; and provide the answers to the questions using the data from the storage service.

16. The system of claim 15, further comprising a text-to-speech service to convert a text output of the MQMA ML model into audio.

17. The system of claim 15, further comprising an optical character recognition service to generate text from an input visual file.

18. The system of claim 15, further comprising a speech-to-text service to convert an audio input into text to be used as a potential answer.

19. The system of claim 15, wherein the request further includes one or more of an indication of what data to use as an answer repository, an indication of a type of data found in the answer repository, an indication of a particular location in the data, or an indication of how to present a response.

20. The system of claim 15, wherein the MQMA ML model has been pre-trained using question-answer pairs.

\* \* \* \* \*